May 29, 1928.  
L. H. KAUPKE  
PLANTER  
Filed Sept. 12, 1925  
1,671,244  
2 Sheets-Sheet 1
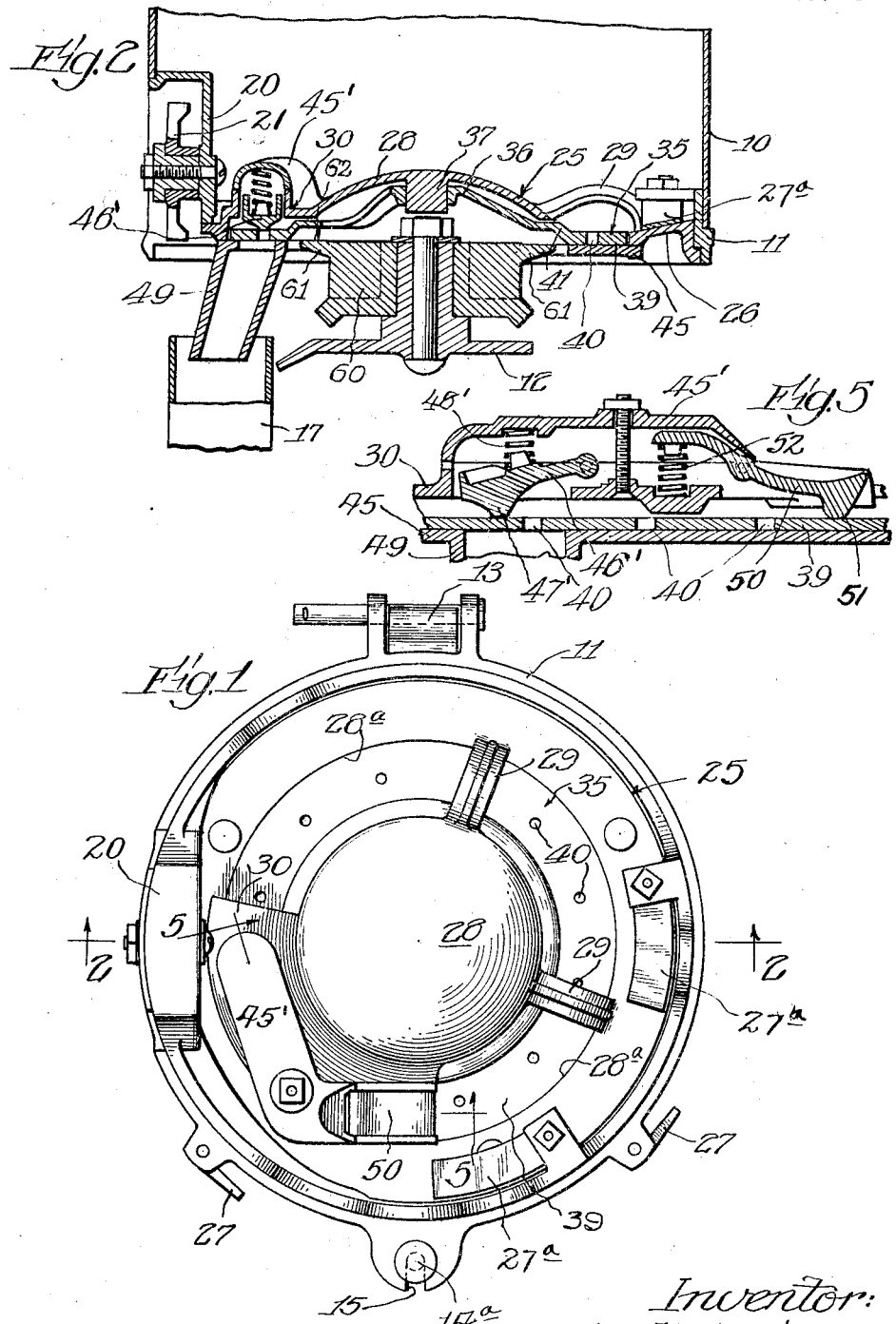

May 29, 1928.

L. H. KAUPKE

PLANTER

Filed Sept. 12, 1925

Witnesses:

Inventor:
Lee H. Kaupke
By Offield Mulhope Scott & Poole
Attys.

Patented May 29, 1928.

1,671,244

UNITED STATES PATENT OFFICE.

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

PLANTER.

Application filed September 12, 1925. Serial No. 55,945.

My invention relates to improvements in corn planters, and has for its principal object, to provide an improved machine for planting corn, and more particularly kaffir corn, and one in which the seed may be planted uniformly and without danger of cracking or grinding the seed, and in which the seed plate is interchangeable with other seed plates for planting different kinds of seed such as cotton.

More especially my invention consists in an improved construction of seed plate and bearing means therefor, which afford tighter joints than heretofore provided between moving parts, so as to eliminate danger of cracking, crushing or grinding the kaffir corn seed, which is somewhat smaller than ordinary corn or cotton seed, and therefore requires special apparatus for the proper handling thereof. A further specific object is to provide means whereby my improved planting mechanism may be substituted for the ordinary corn or cotton planting mechanism without disturbing the other parts of the planting device.

These and other features and objects of my invention will be more clearly understood by having reference to the accompanying drawings, in which I have illustrated one embodiment of my invention.

In the drawings:—

Figure 1 is a top plan view of a seed can base with my improved mechanism attached thereto.

Figure 2 is a sectional view of a seed can taken on line 2—2 of Figure 1.

Figure 5 is a detail section taken on line 5—5 of Figure 1.

Figure 3:
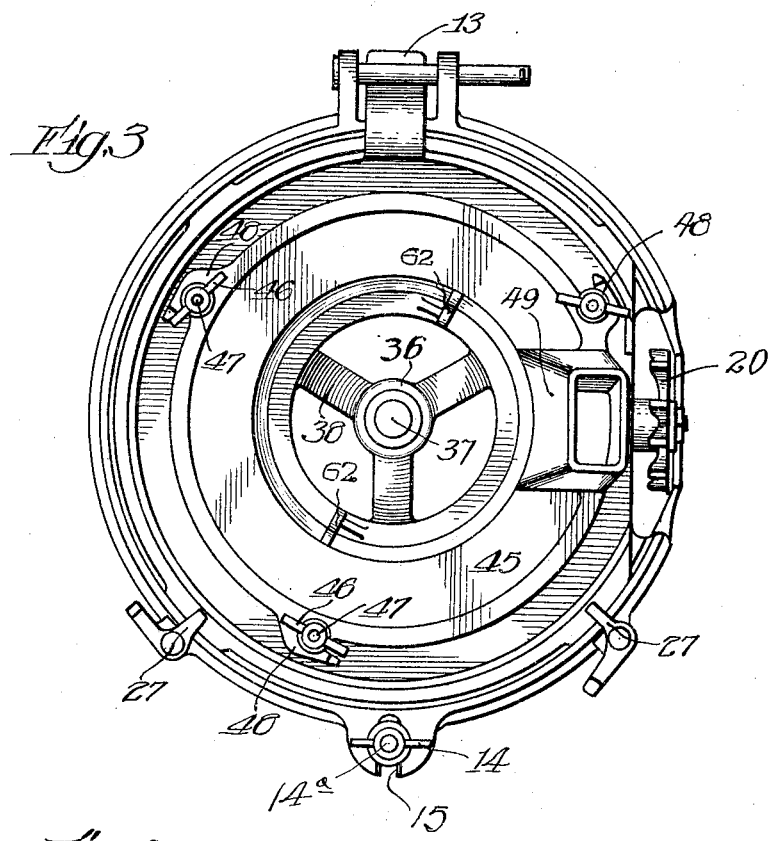
Figure 3 is a bottom view of the can.
Figure 4:
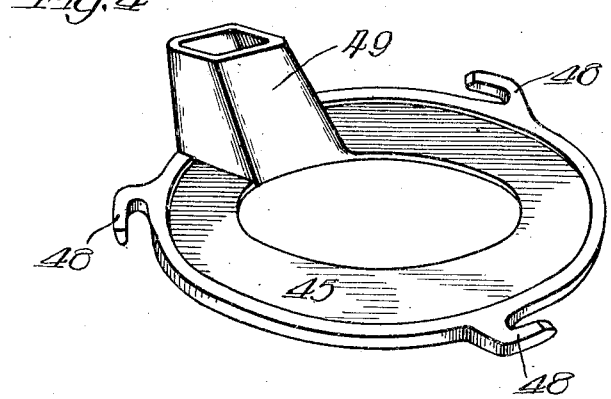
Figure 4 is a detail view in perspective showing the bottom of the base plate forming a part of my attachment.

Referring to details of the embodiment of the invention illustrated in the drawings, a seed can 10 is carried by a base ring 11 which is pivotally mounted at one side to the main frame 12 by means of a hinge connection 13. When the can is in upright position, it may be held in place by a wing nut 14 on bolt 14ª carried on the frame and engaging in a slot 15 in the base ring 11. Mounted in connection with the frame 12 is a spout 17 through which the seed is dropped for planting.

In the form shown herein, my invention is shown as adapted to a seed can which is primarily designed for use with ordinary seed plates, such as used for cotton or corn planting, and for this purpose the base ring is provided with a picker-wheel housing 20 formed integral therewith at one side thereof, above the spout 17, and having a picker-wheel 21 mounted therein. It will be understood, however, that this picker-wheel is not used in connection with the mechanism forming the subject matter of the present invention, but is in position to be utilized in connection with the ordinary or standard form of seed plate, with which my special kaffir corn mechanism is interchangeable.

Referring now to details of my improved planting mechanism, I provide a spider 25, having an outer annular portion 26, fitting in the bottom of the base ring 11 and detachably secured therein by suitable means such as hinged lugs 27, 27 (see Figure 3).

A central cap portion 28 of the spider 25 is spaced radially from the annular portion 26 to form arcuate openings 28ª, 28ª, the latter being spanned by curved arch members 29, 29, and a segmental web 30 adjacent the delivery spout 17 and carrying the ejector mechanism, details of which will hereinafter be described.

Rotatably mounted below the cap member 28, is the seed plate 35. The latter is provided with a center bearing 36, engaging a stud 37 depending from the cap 28, and having spokes 38 extending to the seed ring 39 of said plate, wherein is provided a plurality of spaced holes 40 forming the seed cells. As will be seen in Figure 2, the outer periphery of the seed ring 39 closely fits against the annular portion 26 of the spider 25, while the inner portion of said ring has an upwardly curved portion 41 adjacent the margin of the cap member 28, to form a downwardly inclined continuation of the dome-shaped upper surface of the latter.

The seed plate 35 is provided with a discharge spout 49, and is secured in closely fitting engagement with the spider 25, as shown, by a base plate 45, extending beneath the seed ring 39 and detachably connected to the annular portion 26 of said spider by wing-nuts 46 threaded on bolts 47 and engaging in notches 48 on the edge of said base plate so as to be removable by partial relative rotation of the parts. In the form shown each pair of registering bolts 47 and notches 48 are spaced at irregular intervals about the late 45 so as to assure the proper positioning of said plate, with its seed spout 49 beneath the ejector mechanism.

The ejecting mechanism is mounted in a housing 45' forming part of the connecting web 30 between the cap member 28 and annular ring portion 26. Details of this mechanism are shown in Figure 5, in which it will be seen that a finger 46' is pivotally mounted with an ejector pin 47' in position to engage in each successive seed cell 40 as the seed plate is rotated. Said finger is held under compression of spring 48'. Cut off means are provided for limiting the passage of seeds in the cells before they are ejected, such means herein shown comprising a finger 50 having a bevelled surface 51 and under pressure of spring 52 so as to engage the upper surface of the seed ring 39 just in advance of the ejector. The arrangement is such that the cells 40 are of the proper size to accommodate one seed, and the passage of seeds on the surface of the plate is restrained or cut off by the finger 50.

The power for driving the seed plate is derived from suitable variable speed driving mechanism of usual type, connected to the plate by a gear 60 mounted on the frame 12 beneath the can and having arms 61, 61 adapted to engage lugs 62, 62, projecting downwardly from the under surface of the seed plate within the boundaries of the base plate 45, as clearly shown in Figure 2. This arrangement permits the seed can to be tipped on its hinged connection 13 when desired.

Among the advantages of the device above described is the provision of means for affording close-fitting joints between the moving parts of the mechanism, commensurate with simplicity of construction and ease of assembling and disassembling the parts.

I claim:

1. In a planter, a seed can, a seed plate at the bottom of said can provided with a series of seed cells, a cap member covering the central portion of said seed plate and having close fitting engagement with the latter adjacent said seed cells, a ring surrounding said seed plate and rigidly connected with said cap member, a base plate having three or more threaded members adapted to afford detachable connection with said ring beneath said seed plate and forming an adjustable bearing to hold the two last named elements in close fitting engagement with each other, and means for ejecting seed from said seed plate.

2. In a planter, a seed can, a seed plate at the bottom of said can provided with a series of seed cells, a cap member covering the central portion of said seed plate and having close fitting engagement with the latter adjacent said seed cells, a ring surrounding said seed plate and rigidly connected with said cap member, a base plate having means affording detachable engagement with the bottom of said ring beneath said seed plate at three or more spaced points to hold the latter in close fitting engagement, and means for ejecting seed from said seed plate.

Signed at Rock Island, Ill., this 9th day of September, 1925.

LEE H. KAUPKE.